(12) United States Patent
Ament

(10) Patent No.: US 6,769,400 B1
(45) Date of Patent: Aug. 3, 2004

(54) METHOD FOR CONTROLLING EMISSIONS

(75) Inventor: Frank Ament, Troy, MI (US)

(73) Assignee: General Motors Corporation, Detroit, MI (US)

(*) Notice: Subject to any disclaimer, the term of this patent is extended or adjusted under 35 U.S.C. 154(b) by 5 days.

(21) Appl. No.: 10/350,503

(22) Filed: Jan. 24, 2003

(51) Int. Cl.[7] .............................. B60K 6/00; F02D 41/06
(52) U.S. Cl. ........................ 123/399; 123/478; 123/491; 60/716; 701/22; 180/65.2
(58) Field of Search ................... 123/399, 478, 123/491, 295, 304, 492, 493, 3, 575, 576, 577, 525, 179.7, 179.16, 179.19; 60/716; 701/104, 110, 113, 22, 54; 180/65.4, 65.5, 65.8

(56) References Cited

U.S. PATENT DOCUMENTS

| | | | | |
|---|---|---|---|---|
| 5,588,498 A | * | 12/1996 | Kitada | 180/65.4 |
| 5,826,671 A | * | 10/1998 | Nakae et al. | 180/65.2 |
| 6,026,921 A | * | 2/2000 | Aoyama et al. | 180/65.2 |
| 6,164,400 A | * | 12/2000 | Jankovic et al. | 180/65.2 |
| 6,170,587 B1 | * | 1/2001 | Bullock | 180/69.6 |
| 6,321,714 B1 | * | 11/2001 | Grizzle et al. | 123/295 |
| 6,330,498 B2 | * | 12/2001 | Tamagawa et al. | 701/22 |
| 6,367,570 B1 | * | 4/2002 | Long et al. | 180/65.2 |
| 6,657,315 B1 | * | 12/2003 | Peters et al. | 290/40 C |
| 2003/0173123 A1 | * | 9/2003 | Nakanowatari | 180/65.2 |

* cited by examiner

*Primary Examiner*—Hai Huynh
(74) *Attorney, Agent, or Firm*—Christopher DeVries

(57) ABSTRACT

A method is provided for controlling emissions in a parallel hybrid motor vehicle that includes an electric propulsion system in parallel with a combustion propulsion system. In accordance with one embodiment of the invention, manifold absolute pressure (MAP) is monitored in the intake manifold of the combustion propulsion system. The electric propulsion system is engaged to reduce the MAP to a predetermined pressure, and then fueling and combustion of the combustion propulsion system are initiated only after the MAP is reduced to a pressure less than the predetermined pressure.

15 Claims, 3 Drawing Sheets

METHOD FOR CONTROLLING EMISSIONS

TECHNICAL FIELD

This invention relates generally to a method for controlling emissions and, more specifically, to a method for controlling emissions by controlling cold start intake manifold pressure in a parallel hybrid motor vehicle.

BACKGROUND OF THE INVENTION

When an internal combustion engine (ICE) in a motor vehicle is initially started (especially in a cold climate), the interior surfaces of the engine are cold. In addition, because the engine is initially turning at a very low RPM, the intake manifold absolute pressure (MAP) is near atmospheric pressure. Because liquid fuel does not combust as easily or cleanly as gaseous fuel, it is desirable that the fuel sprayed into and mixed with the air jet traveling into the combustion cylinders of the engine be vaporized in order to reduce emissions from the ICE. Unfortunately, both the relatively high MAP and the cold condition of the engine make it difficult to vaporize the fuel injected into the combustion cylinders. Therefore, in order to produce the desired amount of power at start-up and during high-torque initial accelerations shortly after start-up when the engine is still cold, additional (i.e., excess) amounts of fuel must be pumped into the intake manifold to obtain a sufficient amount of vaporized fuel. All of the additional fuel is not completely vaporized and the incompletely vaporized fuel is not completely combusted. The consequence of the poor fuel vaporization at startup and during initial high-torque accelerations is increased emissions. The excess fuel that is not completely combusted at start-up and the period shortly after start-up creates an exhaust mixture that is too fuel-rich to be stoichiometric at the catalytic converter, thus leading to increased hydrocarbon and carbon monoxide emissions.

Under most operating conditions, once the intake valves have heated up adequately (usually within about 60 seconds after engine start-up), the excess fuel is no longer necessary, as the intake valves are hot enough to properly vaporize the injected fuel. At this time, the engine RPM is also high enough to provide a low MAP, assisting with the fuel vaporization. Even in high torque-demand situations, such as during acceleration, which causes the MAP to increase, the hot intake valves are able to vaporize the fuel so that it combusts thoroughly.

High emissions, however, can also result from rapid changes in MAP even with the engine heated, as well as from the high MAP at startup. When there is a rapid drop in torque demand, such as at the end of a rapid acceleration, the throttle closes and the MAP will quickly drop from the high MAP consistent with the rapid acceleration to a low MAP consistent with the lower torque demand. Any liquid fuel left in the intake manifold after the throttle closes rapidly flashes to a gaseous state because of the low MAP and the hot engine components. There is usually too little of this gaseous fuel to fully combust; the fuel-air mixture is too lean (has too much air present) to properly and completely ignite in the cylinder combustion chamber. The unburned fuel-air mixture is exhausted and passes to the catalytic converter. This unburned fuel-air mixture again leads to increases in the hydrocarbon and carbon monoxide emissions.

Air injection reaction (AIR) systems have been employed as one means to reduce the emissions resulting from start-up and from the driving immediately thereafter by pumping air into the exhaust manifold. The injected air helps provide the catalytic converter with a stoichiometric mixture of unburned fuel and air. Additionally, advanced engine controls and advanced fuel-swirling devices have been used to provide a more easily ignited air/fuel mixture for injection into the cylinders. Problems exist, however, with both of these approaches. The AIR system is only used for about 20 seconds at the initial start-up of the motor vehicle and has no function thereafter in the operation of the motor vehicle. The AIR system adds weight and complexity (and thus cost) to the motor vehicle and yet is only functionally necessary for a short period of time at cold start-up. The advanced engine controls and fuel-swirling techniques also add complexity and cost to the motor vehicle. Both of these methods help primarily with reducing start-up and initial emissions and are largely unable to reduce emissions in other driving situations such as conditions resulting in rapid changes in MAP.

Presently available methods for controlling emissions during cold start-up and in situations of rapid changes in MAP are costly and/or ineffective. Accordingly, a need exists for an improved emissions control method that will provide cold start intake manifold pressure control and that can provide a reliable method of limiting both the range of the intake manifold absolute pressure and the rate of change of intake manifold absolute pressure in the interests of lowered emissions throughout the operation of the motor vehicle.

SUMMARY OF THE INVENTION

In accordance with one embodiment of the invention, a method is provided for controlling emissions in a parallel hybrid motor vehicle that includes an electric propulsion system in parallel with a combustion propulsion system. Manifold absolute pressure (MAP) is monitored in the intake manifold of the combustion propulsion system. The electric propulsion system is engaged to reduce the MAP measured in the intake manifold to a predetermined pressure, and then fueling and combustion of the combustion propulsion system are initiated only after the MAP is reduced to a pressure less than the predetermined pressure.

BRIEF DESCRIPTION OF THE DRAWINGS

The emissions control method in accordance with the invention will be understood after review of the following description considered together with the drawings in which.

DESCRIPTION OF THE PREFERRED EMBODIMENT

The cold start intake manifold pressure control method in accordance with the invention is applicable to parallel hybrid powertrain motor vehicles. The parallel hybrid drive train motor vehicle includes a battery-pack operated electric propulsion system (such as an electric motor) coupled in parallel with a combustion propulsion system (such as an internal combustion engine). For ease of description, but without limitation, the electric propulsion system and the combustion propulsion system will hereafter be referred to as an electric motor and an internal combustion engine, respectively. In accordance with the invention, during start-up and any high-torque demand situations within a short but predetermined time period after start-up of the internal combustion engine (ICE), an electric motor supplements the torque that the internal combustion engine is called upon to provide so that the manifold absolute pressure (MAP), as measured in the intake manifold of the ICE, remains in a predetermined MAP range. The electric motor and internal combustion engine together provide enough combined torque to meet driving condition. The lowered MAP provides for adequate vaporization of fuel injected into the combustion chambers of the internal combustion engine even under cold engine conditions so that the cold start engine emissions are controlled. After this predetermined amount of time has elapsed, the intake valves of the internal combustion engine are hot enough to properly vaporize the liquid fuel regardless of the MAP. During and after this time period, in accordance with a further embodiment of the invention, a control unit also regulates throttle opening and torque from the electric motor in order to avoid rapid MAP changes that may result in high emissions.

Figure 1:
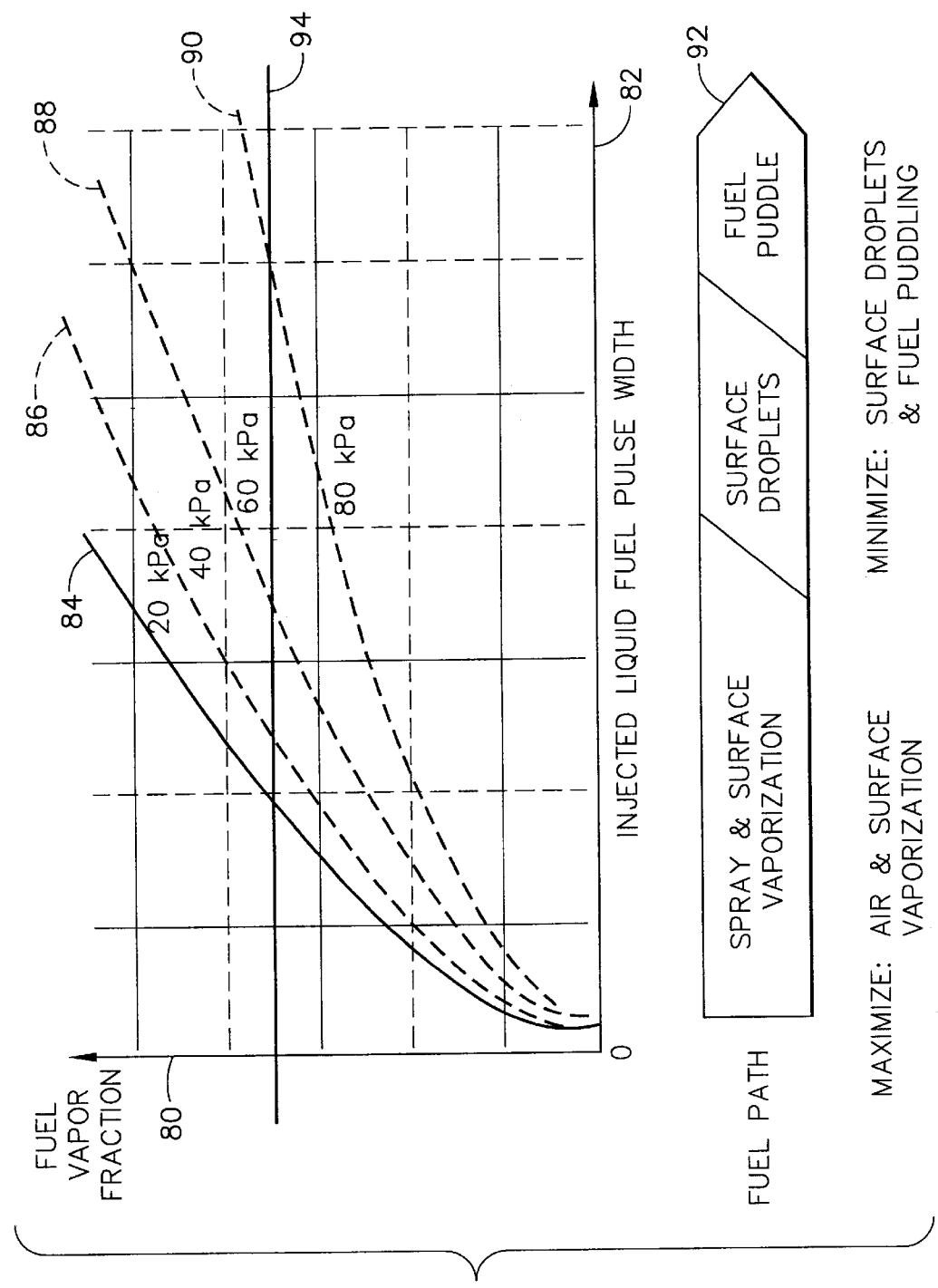
FIG. 1 illustrates in graphical form the effect of intake manifold pressure on cold start fuel vaporization.

FIG. 1 illustrates graphically the effect of manifold absolute pressure (MAP) as measured in the intake manifold on cold start fuel vaporization. Fuel vapor fraction is plotted on vertical axis 80 and injected liquid fuel pulse width (the amount of time the fuel injector sprays fuel) is illustrated on horizontal axis 82. Lines 84, 86, 88, and 90 illustrate the resulting fuel vapor fraction as a function of injected fuel pulse widths with intake manifold absolute pressure [measured in kilopascals (kPa) as a parameter]. Fuel path 92 appearing below the graph illustrates the effect of injected fuel pulse width on resulting vaporization. For low emission operation of the motor vehicle, it is desirable to have an injected fuel pulse width that provides the vapor fraction necessary to meet the demanded torque load, while being short enough to insure that the injected fuel remains in a spray or surface vaporization state. If the pulse width is too long, the injected fuel does not vaporize adequately and instead is present as surface droplets. In the extreme case, if excessive fuel is injected (long pulse width), liquid fuel collects and becomes a fuel puddle. Neither surface droplets nor fuel puddles combust well and are therefore detrimental to emissions. Line 94 in FIG. 1 indicates the vapor fuel fraction necessary to meet the load conditions. Thus, it can be seen that a MAP of about 70 kPa or less is desirable as it allows an injected fuel pulse width short enough to insure that the fuel path remains as spray and surface vaporization, and not as surface droplets or fuel puddles. For example, as line 90 illustrates, the injected fuel pulse width required to meet the torque demand load at a MAP of 80 kPa is too long and falls into the fuel puddle range of the fuel path. FIG. 1 also illustrates the need to control the rate of MAP change from a higher load to a lower load. As illustrated by line 90, to meet the load requirement at a higher MAP, such as at 80 kPa, some fraction of the injected fuel is not vaporized. When the throttle plate is released, there is a sudden drop in air mass, and the MAP falls to a lower value such as 40 kPa, as line 86 illustrates. The resulting excess fuel vapor fraction that is generated at the lower pressure creates an uncontrolled fuel-rich mixture that passes uncombusted through the combustion chamber and into the catalytic converter, where it cannot be completely oxidized.

Figure 2:
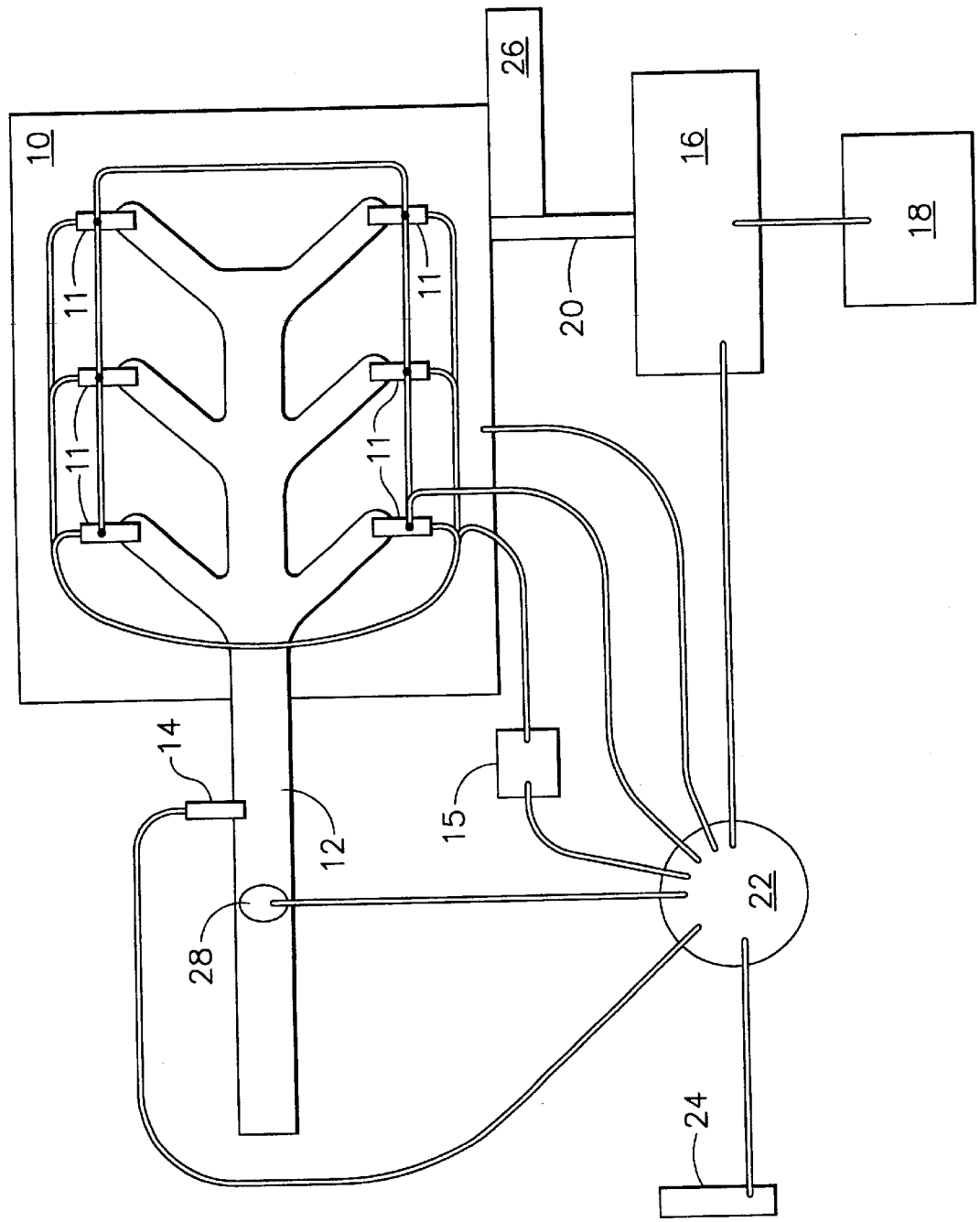
FIG. 2 schematically illustrates a parallel hybrid cold start intake manifold pressure emission control method in accordance with one embodiment of the invention.

FIG. 2 illustrates schematically, in accordance with an embodiment of the invention, a parallel hybrid cold start intake manifold pressure emission control method. Intake manifold 12 conveys air to each cylinder of an internal combustion engine (ICE) 10. In accordance with the illustrated embodiment, ICE 10 is a six cylinder engine, although the method is applicable to an ICE with a greater or lesser number of cylinders. Six fuel injectors 11 reside inside the ends of intake manifold 12, each fuel injector proximate the intake port of one of the six cylinders. Fuel pump 15 delivers fuel to fuel injectors 11. A pressure sensor 14 is located inside intake manifold 12 to provide measurements of the manifold absolute pressure (MAP) in the manifold. Throttle flap 28 controls the amount of air allowed to pass through intake manifold 12 to each individual cylinder in ICE 10. The throttle flap rotates through a ninety degree arc within the intake manifold, from a "closed" position perpendicular to the air stream flow that completely blocks air flow, to an "open" position parallel to the air stream flow that allows an unrestricted air flow. ICE 10 delivers power to transmission 26 which, in turn, is coupled to the drive wheels (not illustrated) of the vehicle. Electric motor 16 draws power from battery pack 18 and is connected to ICE 10 by coupling 20. Coupling 20 may be, for example, a system of gears, a belt drive, or the like. Coupling 20 allows the electric motor to act as a starter motor for ICE 10 as well as to provide power to transmission 26 either in parallel with ICE 10 or in opposition to it. Accelerator pedal sensor 24 measures torque demand based on the position of the accelerator pedal (not illustrated) and relays signals to control unit 22 regarding this torque demand. Control unit 22 is configured to receive communicatory signals from pressure sensor 14 and accelerator pedal sensor 24, to send communicatory signals to fuel injectors 11, and to send and receive communicatory signals to and from ICE 10, throttle flap 28, and electric motor 16. Through these signals control unit 22 is configured to control the frequency and length of the injected fuel pulse width of the fuel injectors as well as the degree to which throttle flap 28 is open. The control unit is programmed to calculate the volume of air passing through intake manifold 12 based on the degree to which the throttle flap is open. Control unit 22 also is able to continuously adjust the frequency and pulse width of the fuel injectors to match the volume of incoming air from the intake manifold in order to create a fuel/air mixture that meets engine demand and is also highly efficient and low in emissions. The control unit also controls the amount of power electric motor 16 sends ICE 10 through coupling 20. Control unit 22 may be, for example, a stand alone processor unit, a portion of the engine control unit, or the like.

Figure 3:
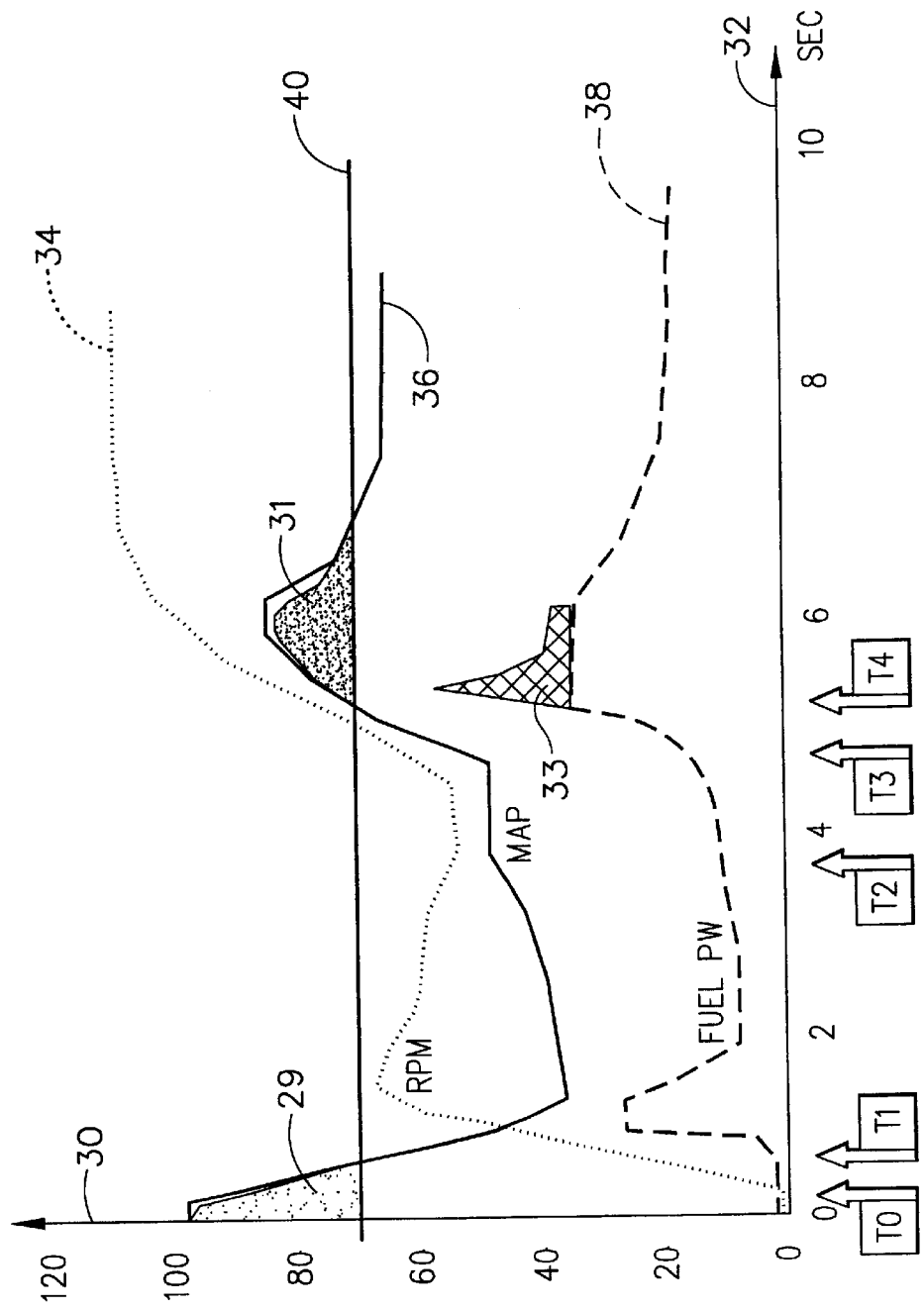
FIG. 3 illustrates in graphical form the cold start and drive-away MAP limiting for fuel vaporization in accordance with an embodiment of the invention.

FIG. 3 illustrates in graphical form a cold start and drive-away MAP limiting method for fuel vaporization to control vehicle emissions in accordance with an embodiment of the invention. ICE rotations in revolutions per minute (RPM) divided by twenty and MAP measured in kPa are plotted on vertical axis 30, with time in seconds plotted on horizontal axis 32. Dotted-line 34 represents ICE RPM, solid line 36 represents intake manifold absolute pressure, and dashed-line 38 represents fuel pulse width. Again with reference to FIG. 2, for the first start of ICE 10 at time T0, control unit 22 monitors the intake manifold absolute pressure (MAP) using pressure sensor 14 while electric motor 16 begins powering ICE 10 (with throttle flap 28 closed and without fuel being delivered to the ICE) to a high RPM, low MAP engine rotational speed such as about 500–600 RPM. Once the control unit senses, at time T1, through pressure sensor 14, that the MAP has dropped below a predetermined upper pressure limit (for example, 70 kPa, represented on FIG. 3 by horizontal line 40), the control unit causes throttle flap 28 to open partially and causes the fuel pump to begin pumping fuel to the fuel injectors 11, which then begin spraying fuel into the cylinders of ICE 10. Control unit 22 then initiates combustion. As soon as ICE 10 begins combusting fuel and powering itself, electric motor 16 stops powering the ICE. Control unit 22 monitors torque demand based on signals from accelerator pedal sensor 24 and adjusts both the throttle flap opening and the fuel injectors' pulse width. At time T2, transmission 26 is shifted into a gear and the MAP increases slightly as the throttle flap is opened further. Time T3 represents the time at which the controller initiates a moderate acceleration or "crowd," such as when the motor vehicle is backed out of a garage or accelerates into traffic. As more torque is demanded from the engine, control unit 22 increases throttle flap opening (to increase air flow to the ICE cylinders) and increases the injected fuel pulse width, in order to provide the cylinders with more fuel, while monitoring MAP through pressure sensor 14. If the MAP reaches the predetermined pressure limit (line 40) before the ICE can meet torque demand, as illustrated at time T4 in FIG. 3, control unit 22 maintains the opening setting of throttle flap 28 and the fuel injector pulse width at their existing values (in order to keep MAP below the predetermined upper pressure limit) and, at the same time, causes electric motor 16 to provide transmission 26 (through coupling 20) with any additional torque necessary to meet demand. The electric motor continues supplementing the torque from the ICE until the intake manifold MAP drops below the upper pressure limit (line 40). In FIG. 3 shaded areas 29 and 31 represent the times electric motor 16 is supplementing the torque demand and indicate the times MAP would exceed the predetermined upper pressure limit if it were not for the use of the electric motor. Similarly, cross-hatched area 33 indicates the high pulse width fuel injection (with its attendant high liquid fraction) that is avoided by the use of the electric motor. The foregoing method, in accordance with the invention, of preventing the MAP from exceeding a predetermined upper pressure limit by controlling throttle flap opening and injector fuel pulse width and using the electric motor to provide supplemental torque necessary to meet demand continues for a predetermined amount of time (for example, 60 seconds). Once this time period has elapsed, the intake valves of the ICE should be hot enough to properly vaporize the liquid fuel, regardless of MAP. The control unit then no longer limits the fuel pump opening based on the upper MAP limit.

In accordance with a further embodiment of the invention, control unit 22 is also programmed to implement a second emission control method in response to sudden drops in torque. High emissions can result from sudden, negative changes in MAP (rapid changes from a high MAP to a low MAP that follow a drop in torque demand, such as after an acceleration) when the throttle flap is abruptly closed and liquid fuel in the intake manifold, due to the rapid pressure gradient, flashes to a gaseous state. The remaining fuel mixture, being too lean to burn properly in the cylinders, temporarily raises emissions. When control unit 22 senses, based on signals from accelerator pedal sensor 24, a sudden drop in torque demand, control unit 22 partially closes throttle flap 28 but does not fully close it. Instead, the control unit commands electric motor 16 to provide, through coupling 20 to transmission 26, a torque that works counter to the torque of the internal combustion engine. The electric motor thus creates a resistive torque in partial opposition to the torque from ICE 10, so that the resultant torque, the combined torque from the electric motor and the ICE, is the amount demanded by accelerator pedal sensor 24. Because the throttle flap is still partially open, the rapid negative change in MAP and the high emissions that result from such a change are avoided. This method of maintaining a throttle flap opening and using the electric motor to provide a resistive torque may be applied anytime during the operation of the motor vehicle when a sudden high to low MAP change might otherwise occur, whether it is during the predetermined startup time period or after this time period.

Thus, it is apparent that there has been provided, in accordance with the invention, a method for controlling emissions in a parallel hybrid motor vehicle that fully meets the needs set forth above. The device is reliable and provides low emissions throughout the operation of the vehicle, not just after a cold first engine start. Although the invention has been described and illustrated with reference to specific embodiments thereof, it is not intended that the invention be limited to such illustrative embodiments. For example, the predetermined time period after startup during which the first method of reducing emissions operates can be tailored to suit different climates or condition. Additionally, the MAP pressure range in which the internal combustion engine is to operate during the predetermined time limit can be adjusted to suit climate, fuel combustion range, and conditions for optimum engine performance. Those of skill in the art will recognize that many variations and modifications of such embodiments are possible without departing from the spirit of the invention. Accordingly, it is intended to encompass within the invention all such modifications and variations as fall within the scope of the appended claims.

What is claimed is:

1. A method for controlling emissions in a parallel hybrid motor vehicle including an electric propulsion system in parallel with a combustion propulsion system, the combustion propulsion system having an intake manifold, the method comprising the steps of:
   monitoring manifold absolute pressure in the intake manifold of the combustion propulsion system;
   engaging the electric propulsion system to reduce the manifold absolute pressure to a predetermined pressure; and
   initiating fueling and combustion of the combustion propulsion system only after the manifold absolute pressure is reduced to a pressure less than the predetermined pressure.

2. The method of claim 1 wherein the step of engaging the electric propulsion system comprises the step of powering the combustion propulsion system to achieve a predetermined combustion propulsion system RPM.

3. The method of claim 1 further comprising the step of terminating the step of engaging after the step of initiating fueling and combustion.

4. The method of claim 1 wherein the step of initiating fueling and combustion comprises the steps of:
   controlling an amount of air supplied through the intake manifold to the combustion propulsion system; and
   controlling an amount of fuel supplied to the combustion propulsion system.

5. The method of claim 4 wherein the step of controlling an amount of fuel injected comprises the step of controlling pulse width and frequency of injection of fuel by a fuel injector positioned to inject fuel into the combustion propulsion system.

6. The method of claim 1 further comprising the steps of:
   continuing to monitor the manifold absolute pressure;
   monitoring torque demand on the combustion propulsion system;
   increasing the amount of fuel and the amount of air supplied to the combustion propulsion system in response to increases in monitored torque demand; and terminating the step of increasing and reengaging the electric propulsion system in response to the manifold absolute pressure reaching the predetermined pressure.

7. The method of claim 6 further comprising the step of terminating the step of re-engaging when the combustion propulsion system is able to supply the torque demand without the manifold absolute pressure exceeding the predetermined pressure.

8. A method for controlling emissions after start-up in a parallel hybrid motor vehicle including an electric propulsion system in parallel with a combustion propulsion system, the combustion propulsion system having an intake manifold, the method comprising the steps of:

initiating propulsion of the parallel hybrid motor vehicle by the combustion propulsion system;

monitoring manifold absolute pressure in the intake manifold of the combustion propulsion system;

engaging the electric propulsion system in parallel with the combustion propulsion system in response to the manifold absolute pressure exceeding a predetermined pressure; and maintaining the electric propulsion system engaged in parallel with the combustion propulsion system until manifold absolute pressure is reduced to the predetermined pressure.

9. The method of claim 8 further comprising the steps of:

monitoring torque demand on the parallel hybrid motor vehicle; and limiting fueling of the combustion propulsion system in response to the manifold absolute pressure reaching a predetermined pressure before the combustion propulsion system is able to supply the torque demand.

10. The method of claim 9 further comprising the step of terminating the step of limiting fueling after a predetermined time.

11. A method for controlling emissions after start-up in a parallel hybrid motor vehicle including an electric propulsion system in parallel with a combustion propulsion system, the combustion propulsion system having an intake manifold, the method comprising the steps of:

initiating propulsion of the parallel hybrid motor vehicle by the combustion propulsion system to produce a driving torque;

monitoring manifold absolute pressure in the intake manifold of the combustion propulsion system;

monitoring torque demand on the parallel hybrid motor vehicle;

adjusting fueling of the combustion propulsion system in response to the monitored torque demand; and in response to a sudden drop in monitored torque demand, to avoid a rapid change in the monitored manifold absolute pressure:

maintaining fueling of the combustion propulsion system at a level higher than necessary to produce a driving torque equal to the monitored torque demand; and engaging the electric propulsion system to produce a torque counter to the driving torque.

12. The method of claim 11 wherein the parallel hybrid motor vehicle comprises a transmission and wherein the step of engaging the electric propulsion system comprises the step of coupling the electric propulsion system to the transmission.

13. The method of claim 11 wherein the step of monitoring torque demand comprises the step of monitoring signals from an accelerator pedal sensor at a control unit.

14. The method of claim 13 wherein the step of adjusting fueling comprises the step of sending a signal from the control unit to adjust a throttle flap.

15. The method of claim 14 wherein the step of maintaining fueling comprises the step of sending a further signal from the control unit to partially close the throttle flap.

* * * * *